(12) United States Patent
Miesner

(10) Patent No.: US 10,848,044 B1
(45) Date of Patent: Nov. 24, 2020

(54) LINEAR ELECTROMAGNETIC ACTUATOR

(71) Applicant: John E Miesner, Fairfax, VA (US)

(72) Inventor: John E Miesner, Fairfax, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/675,901

(22) Filed: Aug. 14, 2017

(51) Int. Cl.
*H02K 33/06* (2006.01)
*H02K 33/16* (2006.01)

(52) U.S. Cl.
CPC ............ *H02K 33/06* (2013.01); *H02K 33/16* (2013.01)

(58) Field of Classification Search
CPC ........ H02K 33/02; H02K 33/06; H02K 33/16; H02K 33/18; H02K 33/00; H02K 35/00; H02K 35/04; H02K 35/06; H02K 335/222; H02K 335/237; H02K 335/238
USPC ... 310/13, 14, 15, 17, 21, 23, 27, 29, 12.15, 310/112.31, 90; 335/222, 237, 238
See application file for complete search history.

(56) References Cited

U.S. PATENT DOCUMENTS

| | | | | |
|---|---|---|---|---|
| 3,022,450 A | * | 2/1962 | Chase, Jr. | H01F 7/1615 361/194 |
| 3,772,540 A | * | 11/1973 | Benson | H01F 7/145 310/14 |
| 5,231,336 A | * | 7/1993 | van Namen | F16F 7/1011 318/128 |
| 5,587,615 A | | 12/1996 | Murray et al. | |
| 6,242,823 B1 | * | 6/2001 | Griswold | H02K 41/0356 310/12.12 |
| 6,873,067 B2 | * | 3/2005 | Ichii | A61C 17/34 310/15 |
| 7,078,833 B2 | * | 7/2006 | Xu | H01F 7/14 310/12.33 |
| 7,113,064 B2 | * | 9/2006 | Loubat | F16F 7/1011 335/220 |
| 7,328,474 B2 | * | 2/2008 | Nishinaka | A61C 17/3445 15/22.1 |
| 8,492,937 B2 | * | 7/2013 | Roberts | H02K 35/00 310/25 |
| 8,629,569 B2 | * | 1/2014 | Roberts | H02K 35/02 290/1 R |
| 9,390,875 B2 | * | 7/2016 | Kohlhafer | H01H 50/20 |

(Continued)

*Primary Examiner* — Tulsidas C Patel
*Assistant Examiner* — Ahmed Elnakib
(74) *Attorney, Agent, or Firm* — Charles D. Buskey; Dawn C. Russell

(57) ABSTRACT

The invention is an electromagnetic inertial force generator that provides a linear output with improved compactness and reliability because it has no radial gaps and only on pair of axial gaps. Radial permanent magnet rings are directly in contact with inner and outer flux cylinders to provide magnetic bias. The magnetic bias flux flows across two axial air gaps to a supporting flux return structure. A current conducting coil drives magnetic flux across the same axial air gaps. The magnetic bias flux is in opposite directions across the two air gaps while the coil flux across the two gaps is in the same direction. The combination of bias flux and coil flux cancels in one gap and add in the other gap producing a net force on an inertial mass and an equal and opposite force on the supporting structure. The resulting force is linear with current through the drive coil.

14 Claims, 12 Drawing Sheets

(56) References Cited

U.S. PATENT DOCUMENTS

| | | | |
|---|---|---|---|
| 2003/0114999 A1* | 6/2003 | Shimoda | B06B 1/045 |
| | | | 702/56 |
| 2004/0119344 A1* | 6/2004 | Lau | A61C 17/3418 |
| | | | 310/36 |
| 2008/0265692 A1* | 10/2008 | Roberts | H02K 35/02 |
| | | | 310/15 |
| 2010/0127580 A1* | 5/2010 | Schrader | G02B 7/08 |
| | | | 310/12.26 |
| 2013/0234539 A1* | 9/2013 | Genderjahn | F16K 31/082 |
| | | | 310/36 |
| 2018/0062491 A1* | 3/2018 | Miesner | H02K 41/0356 |

* cited by examiner

LINEAR ELECTROMAGNETIC ACTUATOR

STATEMENT OF GOVERNMENT INTEREST

The invention described herein may be manufactured and used by, or for the Government of the United States of America, for governmental purposes without payment of any royalties thereon or therefore.

BACKGROUND OF THE INVENTION

Actuators that generate inertial forces by forced oscillation of a moving mass through the interaction of permanent and electrically generated magnetic fields are commonly known as electromagnetic shakers.

Many applications of shakers require a linear response, which means that the force output is directly proportional to the signal input. Nonlinearities result in a distorted force output which includes harmonics of the input frequency.

U.S. Pat. No. 5,587,615 issued to Murray et al. teaches a method to linearize the output of a magnetic actuator with force generated across air gaps. Murray et al. arranges two air gaps with the total actuator force equal to the difference of the forces across them and then establishes magnetic bias flux in opposite directions in the two gaps and coil flux in the same direction in the gaps. Therefore, as coil flux increases it tends to cancel the bias flux in one gap and add to the bias flux in the other gap. The inherent force generated across an air gap is quadratic with respect to the total flux across the gap. If the bias flux is $\Phi_{bias}$ and the coil flux is $\Phi_{coil}$ then the force in one gap can be written as $F=k(\Phi_{bias}\pm\Phi_{coil})^2$, where k is a proportionality constant dependent on the geometry. The net force in the two gaps can be written as $F_{net}=k[(\Phi_{bias}+\Phi_{coil})^2-(\Phi_{bias}-\Phi_{coil})^2]$. Simplifying this equation yields $F_{net}=4k\,\Phi_{bias}\Phi_{coil}$. Thus the net output force is linear with respect to the coil flux.

Linear electromagnetic shakers may include a radial gap between the stator and the permanent magnets. This results in a radial force between the moving and stationary components, which complicates assembly and applies load to the support bearings increasing friction, and thus wear. The radial gap also adds to the reluctance of the magnet flux path reducing the bias across the axial gaps. Linear electromagnetic shakers may also include two pairs of axial gaps; one between the stator and the pole pieces and one between the moving structure and the supporting structure. These two pairs of gaps increase the axial length of the device.

Consequently, if the radial gap between the stator and the permanent magnets were eliminated, and if one of the pairs of axial gaps were eliminated, the result would be a more compact electromagnetic shaker with improved reliability.

SUMMARY OF THE INVENTION

The present invention provides an electromagnetic inertial force generator (shaker) with improved compactness and reliability because it has no radial gaps and only one pair of axial gaps.

The preferred embodiment of the invention includes top and bottom radially polarized permanent magnet rings between and in contact with an inner flux cylinder and an outer flux cylinder. A drive coil is positioned radially between the inner and outer flux cylinders and axially between the top and bottom magnet rings. The magnet rings, flux cylinders, and drive coil are joined and move as a unit forming the moveable inertial mass of the actuator. The inertial mass is supported by bearings and springs and can move axially with respect to the top and bottom stationary flux returns and support structure. There are top and bottom air gaps between the moving inertial mass and the stationary flux returns to accommodate axial motion.

Magnetic flux from the top and bottom magnet rings pass through the outer flux cylinder, across the air gaps, through the stationary flux returns, back across the air gaps, and through the inner flux cylinder back to the magnet rings to complete a flux loop. The magnetic flux passing across the air gaps provides a bias for the actuator. The magnetic bias flux is in opposite directions across the two air gaps.

Magnetic flux from the drive coil passes from the outer flux cylinder across one air gap, through a stationary flux return, back across the air gap, through the inner flux cylinder, across the other air gap, through a stationary flux return, back across the air gap, and through the outer flux cylinder to complete a flux loop. The coil flux is in the same directions across the two air gaps.

The combination of bias flux and coil flux cancels in one gap and adds in the other gap because the bias flux is in opposite directions across gaps while the coil flux is in the same direction. Thus, there is net force on the inertial mass and an equal and opposite force on the returns. The resulting force is linear with current through the drive coil and will be in the opposite direction when the current through drive coil is reversed.

Another embodiment of the invention operates on the same principles as the preferred embodiment, but uses one radially polarized permanent magnet ring and two drive coils. The permanent magnet ring is between and in contact with an inner flux cylinder and an outer flux cylinder. Two drive coils are located radially between the inner and outer flux cylinders and on each side of the magnet ring. The two drive coils can be either in series or parallel such that the direction of current flow is the same in each coil. The magnet ring, flux cylinders, and drive coils are joined and move as a unit forming the moveable inertial mass of the actuator. The inertial mass is supported by bearings and springs and can move axially with respect to the top and bottom stationary flux returns and support structure. There are top and bottom air gaps between the moving inertial mass and the stationary flux returns to accommodate axial motion.

Magnetic flux from the magnet ring passes through the outer flux cylinder, across the air gaps, through the stationary flux returns, back across the air gaps, and through the inner flux cylinder back to the magnet ring to complete a flux loop. The magnetic flux passing across the air gaps provides a bias for the actuator. The bias flux is in opposite directions across the two air gaps.

Magnetic flux from the drive coils passes from the outer flux cylinder across one air gap, through a stationary flux return, back across the air gap, through the inner flux cylinder, across the other air gap, through a stationary flux return, back across the air gap, and through the outer flux cylinder to complete a flux loop. The coil flux is in the same directions across the two air gaps.

The combination of bias flux and coil flux cancels in one gap and adds in the other gap because the bias flux is in opposite directions across the gaps while the coil flux is in the same direction across the gaps. Thus, there is a net force on the inertial mass and an equal and opposite force on the returns. The resulting force is linear with current through the drive coil and will be in the opposite direction when the current through drive coil is reversed.

In alternate embodiments, a different number and arrangement of radial magnet rings and drive coils may be used as long as the magnetic flux across the two gaps from the magnet ring or rings is in opposite directions across the gaps and the flux from the drive coil or coils is in the same direction across the two gaps.

DETAILED DESCRIPTION OF THE INVENTION

Figure 1:
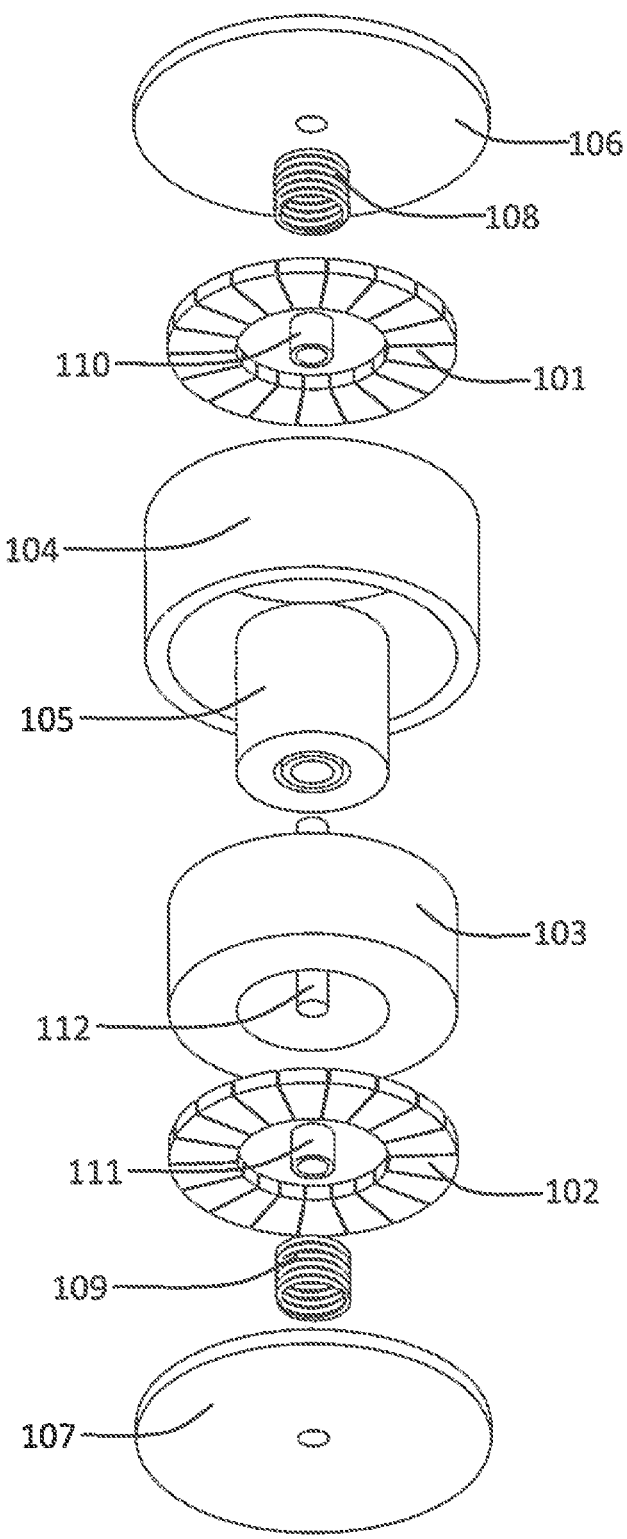
FIG. 1 is an exploded view of the preferred embodiment of the present invention.
Figure 2:
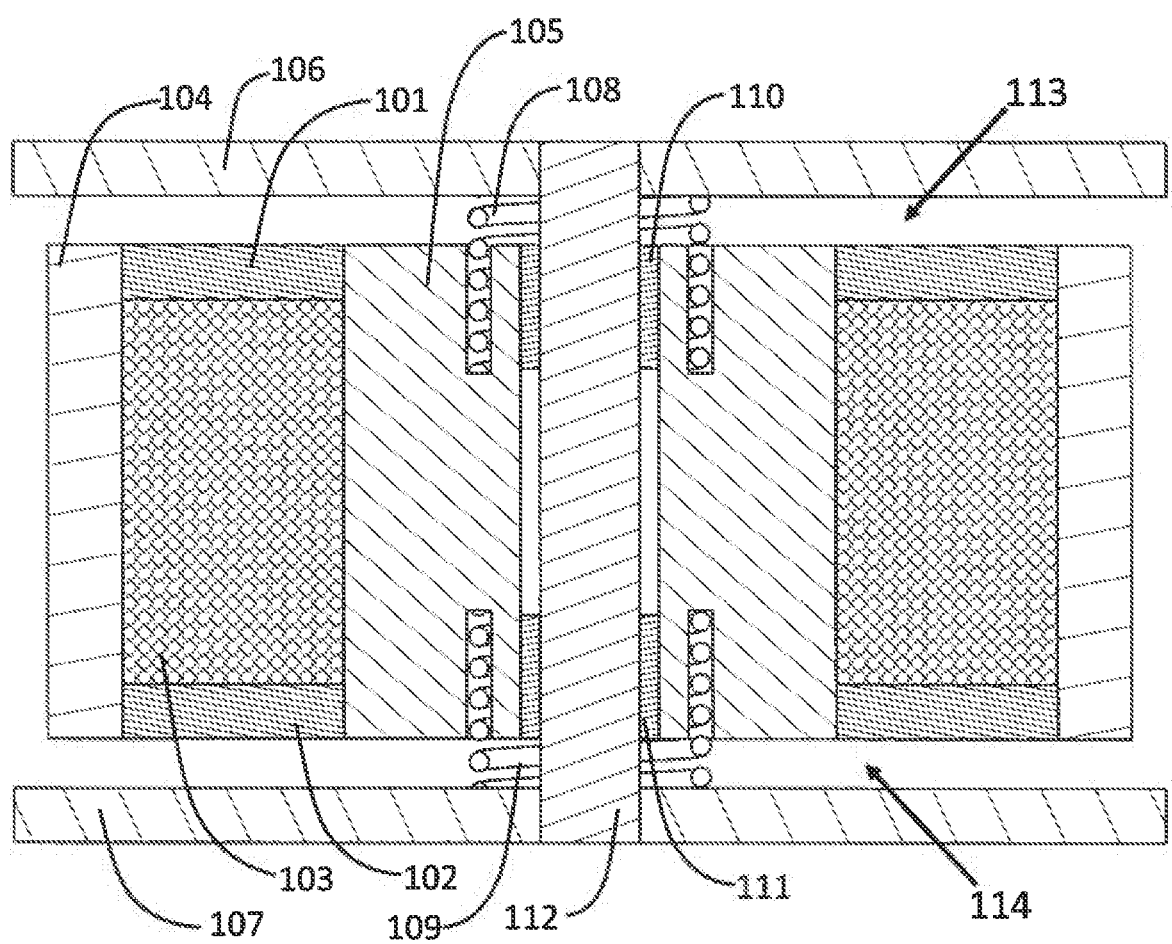
FIG. 2 is a cross sectional view of the preferred embodiment of the present invention.

FIG. 1 and FIG. 2 show two views of the preferred embodiment of the linear electromagnetic actuator of the present invention. The actuator has a top radially polarized permanent magnet ring (101) and a bottom radially polarized permanent magnet ring (102) between and in contact with inner flux cylinder (105) and outer flux cylinder (104). Likewise, drive coil (103) is situated between inner flux cylinder (105) and outer flux cylinder (104), and between the top radially polarized magnet ring (101) and the bottom radially polarized magnet ring (102). The top radially polarized permanent magnet ring (101), the bottom radially polarized permanent magnet ring (102), the inner flux cylinder (105), the outer flux cylinder (104), and the drive coil (103) are joined and move as a unit forming the moveable inertial mass of the actuator. A top stationary flux return (106) and a bottom stationary bottom flux return (107) are separated from the conglomerate inertial mass by top air gap (113) and bottom air gap (114). The inertial mass is slidably mounted by top linear bearing (110) and bottom linear bearing (111) to stationary shaft (112) which connects the top stationary flux return (106) and the bottom stationary flux returns (107). Spring (108) and spring (109), between the top stationary flux return (106), the bottom stationary flux return (107), and the inner flux cylinder (105), provide a restoring force to the inertial mass.

The top radially polarized magnet ring (101) and bottom radially polarized magnet ring (102) are preferably composed of a radial array of high strength magnet segments such as Neodymium Iron Boron (NdFeB) magnets. The inner flux cylinder (104) and outer flux cylinder (103) and top stationary flux return (106) and bottom stationary flux returns (107) are preferably made of silicon steel to provide high permeability and low hysteresis. These components may also be composed of thin laminations to reduce eddy currents. The top spring (108) and bottom spring (109) and the shaft (112) are preferably made of nonferrous material to prevent a flux path bypassing gap (113) and gap (114). Linear bearings (110 and 111) are preferably low friction linear ball bearings to prevent inertial force distortion due to friction. Drive coil (103) is preferably wound from insulated copper wire manufactured for coils known as magnet wire.

Figure 3:
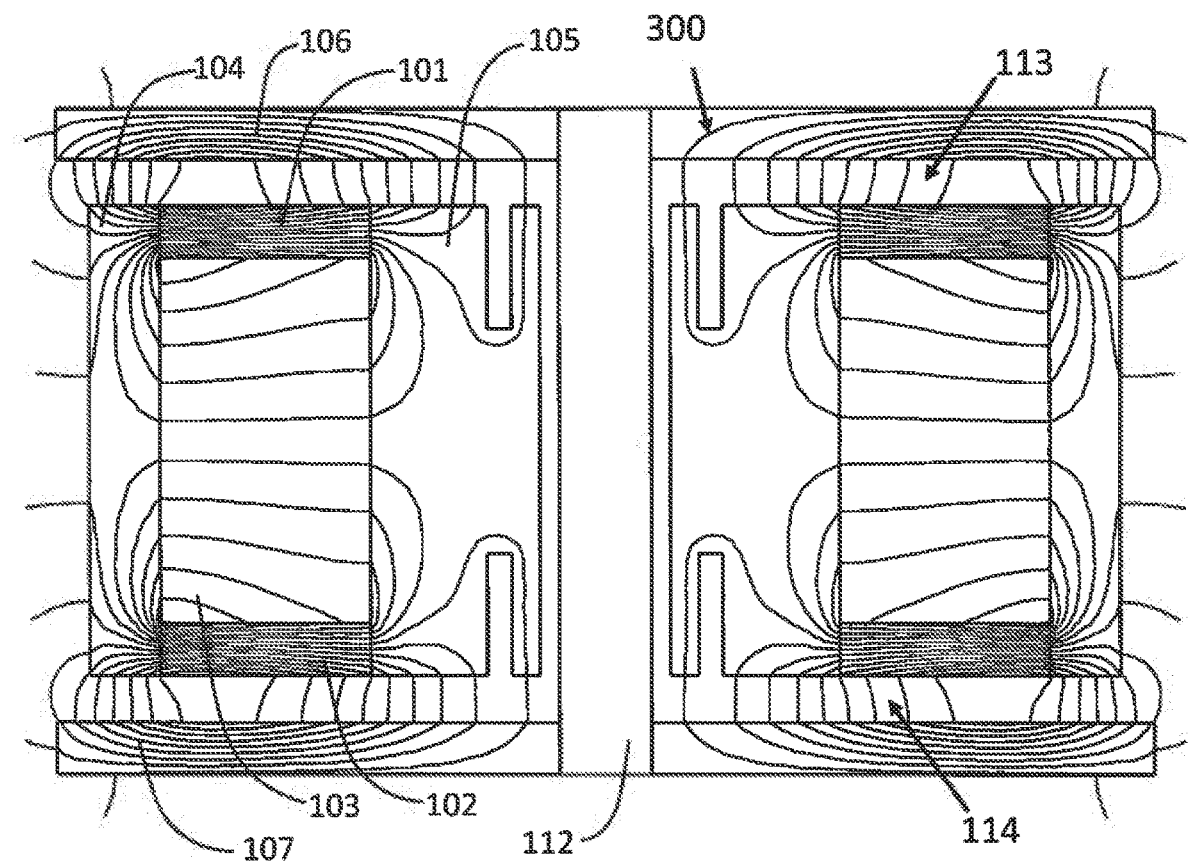
FIG. 3 shows the calculated magnetic flux lines from the permanent magnet rings only for the preferred embodiment of the present invention.

FIG. 3 shows the calculated magnetic flux lines (300) exclusively from top permanent magnet ring (101) and bottom permanent magnet ring (102) (no current through drive coil (103)) when the inertial mass is in the neutral position. A majority of the magnetic flux lines (300) pass from the top permanent magnet ring (101) and bottom permanent magnet ring (102) through outer flux cylinder (104), across gap (113) or gap (114), through the top and bottom stationary flux returns (106 and 107), back across gap (113) or gap (114), and through inner flux cylinder (105) to complete a flux loop back to the top magnet ring (101) and bottom magnet ring (102).

The magnetic flux passing across gap (113) and gap (114) is called the bias flux. The bias flux is in opposite directions across gap (113) and gap (114). For example, if the bias flux is upward between outer flux cylinder (104) and top flux return (106) then it is downward between outer flux cylinder (104) and bottom flux return (107). For this example, the bias flux is downward between inner flux cylinder (105) and top flux return (106) and upward between inner flux cylinder (105) and bottom flux return (107).

The magnetic flux that does not pass across gap (113) and gap (114) is called magnet leakage flux. Magnet leakage flux passes through outer flux cylinder (104), coil (103), and inner flux cylinder (105) to complete a flux loop back to permanent magnet rings (101) and (102). Minimizing magnet leakage flux reduces the magnetic material required and therefore the cost. The preferred embodiment inherently has low leakage flux because flux lines from the top magnet ring (101) and bottom magnet rings (102) repel each other within coil (103) allowing each magnet ring only half of the coil for leakage flux loops. Making the radial extent of magnet rings (101) and (102) as large as practical further reduces the magnet flux leakage.

Figure 4:
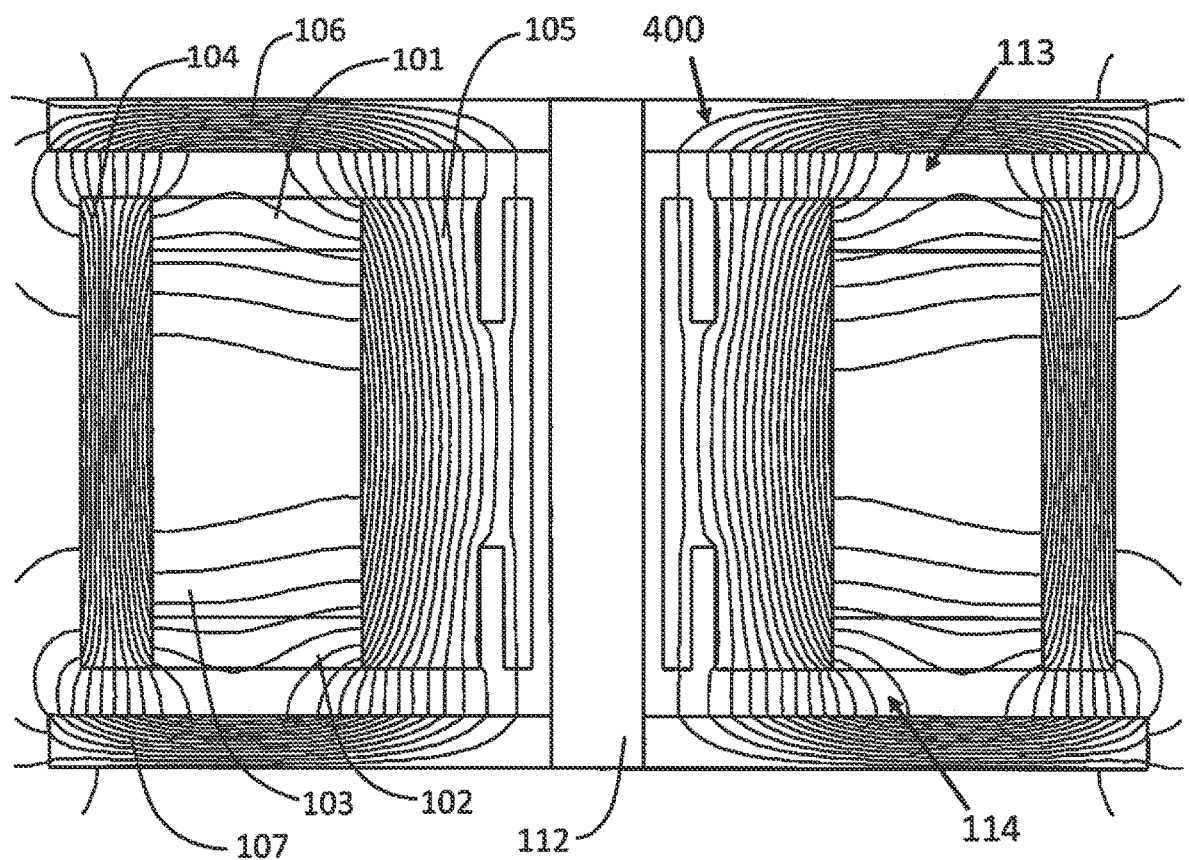
FIG. 4 shows the calculated magnetic flux lines from the drive coil only for the preferred embodiment of the present invention.

FIG. 4 shows the calculated magnetic flux lines (400) from current through drive coil (103) only (no permanent magnet rings) when the inertial mass is in the neutral position. A majority of the magnetic flux lines (400) pass from inner flux cylinder (105) across gaps (113) or (114), through the top stationary flux return (106) and bottom stationary flux returns (107), back across gap (113) or gap (114), to outer flux cylinder (104) and back to inner flux cylinder (105) to complete a flux loop. Coil leakage flux lines (400) pass from inner flux cylinder (105) to outer flux cylinder (104) and back to inner flux cylinder (105) to complete a flux loop without crossing the gap (113) and gap (114). Minimizing coil leakage flux increases efficiency and reduces inductance. Coil leakage flux is minimized by making the top and bottom magnet rings (101) and (102) as thin as practical and the radial extent of the coil (103) as large as practical.

The drive coil magnetic flux passing across gap (113) and gap (114) is in the same direction. That is, if the bias flux is upward between outer flux cylinder (104) and top flux return (106) then it is also upward between outer flux cylinder (104) and bottom flux return (107). For this example, the bias flux is downward between inner flux cylinder (105) and top flux return (106) and also downward between inner flux cylinder (105) and bottom flux return (107).

Figure 5:
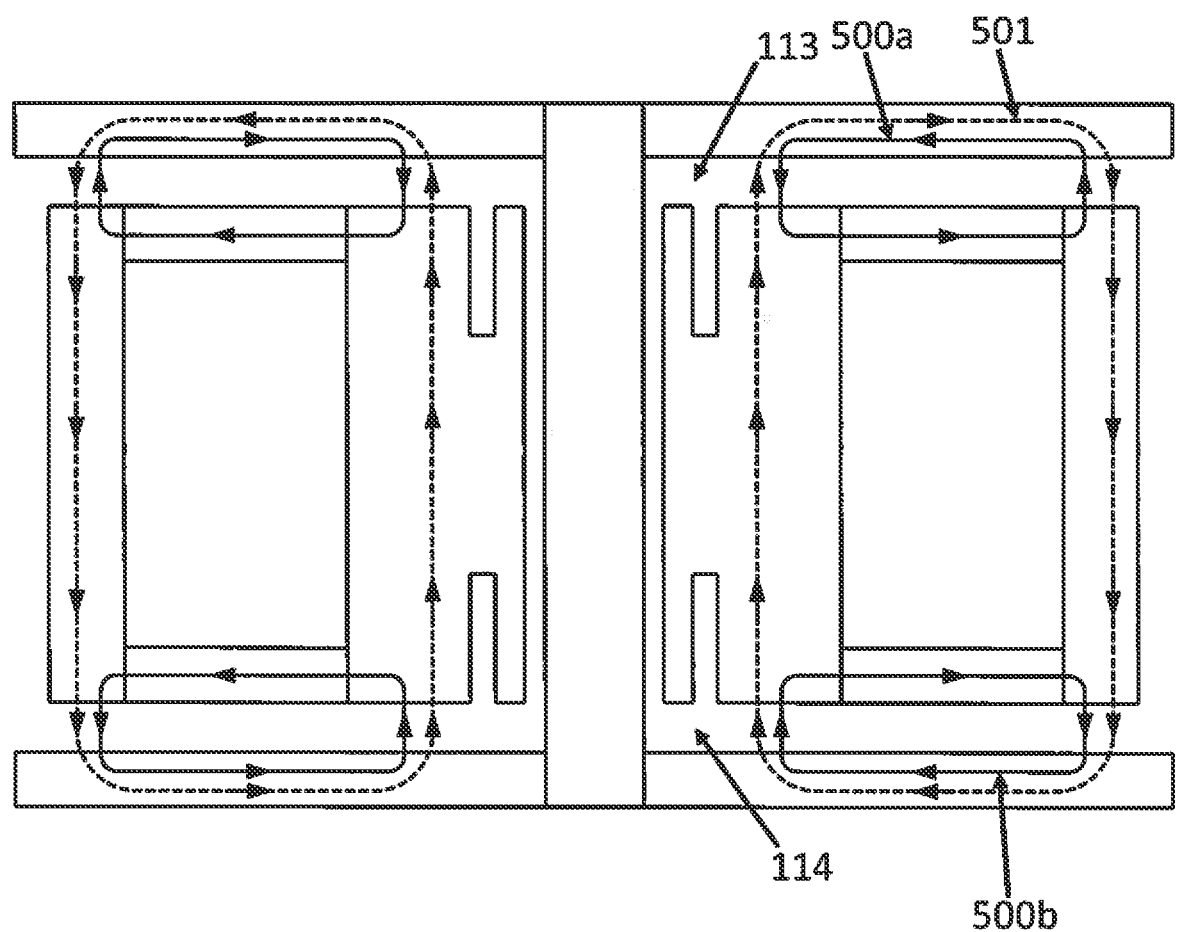
FIG. 5 is a simplified diagram illustrating the primary flux paths for both the permanent magnet rings and the drive coil for the preferred embodiment of the present invention.

FIG. 5 is a simplified diagram illustrating the primary flux paths for both the permanent magnet rings and the drive coil for the preferred embodiment of the present invention. FIG. 5 shows the flux paths of FIG. 3 and FIG. 4 more clearly. Here, it can clearly be seen that the bias flux paths (500a) and (500b) are in opposite directions across gap (113) and gap (114) while the drive coil flux path (501) is in the same direction across the gaps.

Figure 6:
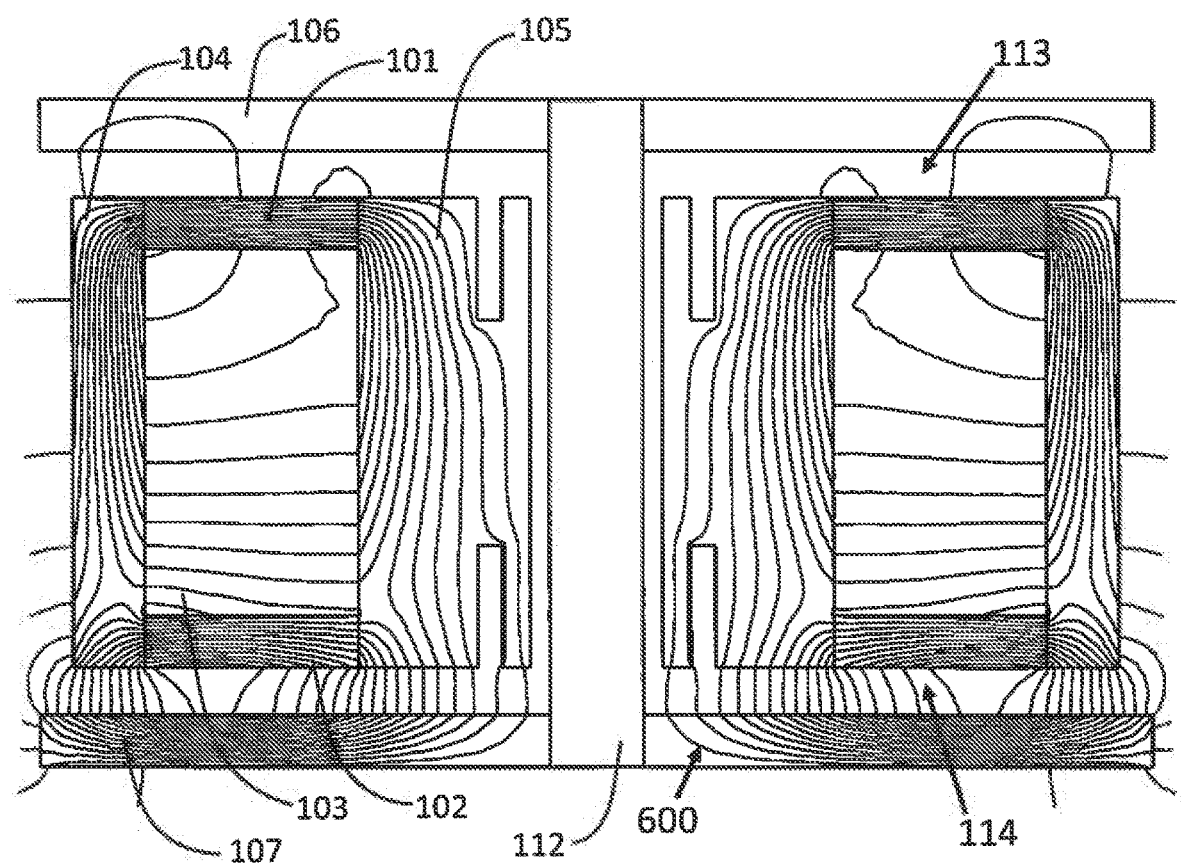
FIG. 6 shows the calculated magnetic flux lines from both the permanent magnet rings and the drive coil for the preferred embodiment of the present invention.

FIG. 6 shows the calculated magnetic flux lines (600) simultaneously from top permanent magnet ring (101) and bottom permanent magnet rings (102) and from current through drive coil (103) when the inertial mass is in the neutral position. The combination of bias flux and coil flux tends to cancel in top gap (113) and add in bottom gap (114) because the bias flux is in opposite directions across gaps (113) and (114) while the coil flux is in the same direction. Thus, there is a net downward force on the inertial mass and an equal and opposite force upward on top stationary flux return (106) and bottom stationary flux returns and (107). The resulting force is linear with current through drive coil (103). When current through drive coil (103) is reversed the combination of bias flux and coil flux cancels in bottom gap (114) and adds in top gap (113) and there is a net upward force on the inertial mass and an equal and opposite force downward on the top stationary flux return (106) and bottom stationary flux returns (107).

Figure 7:
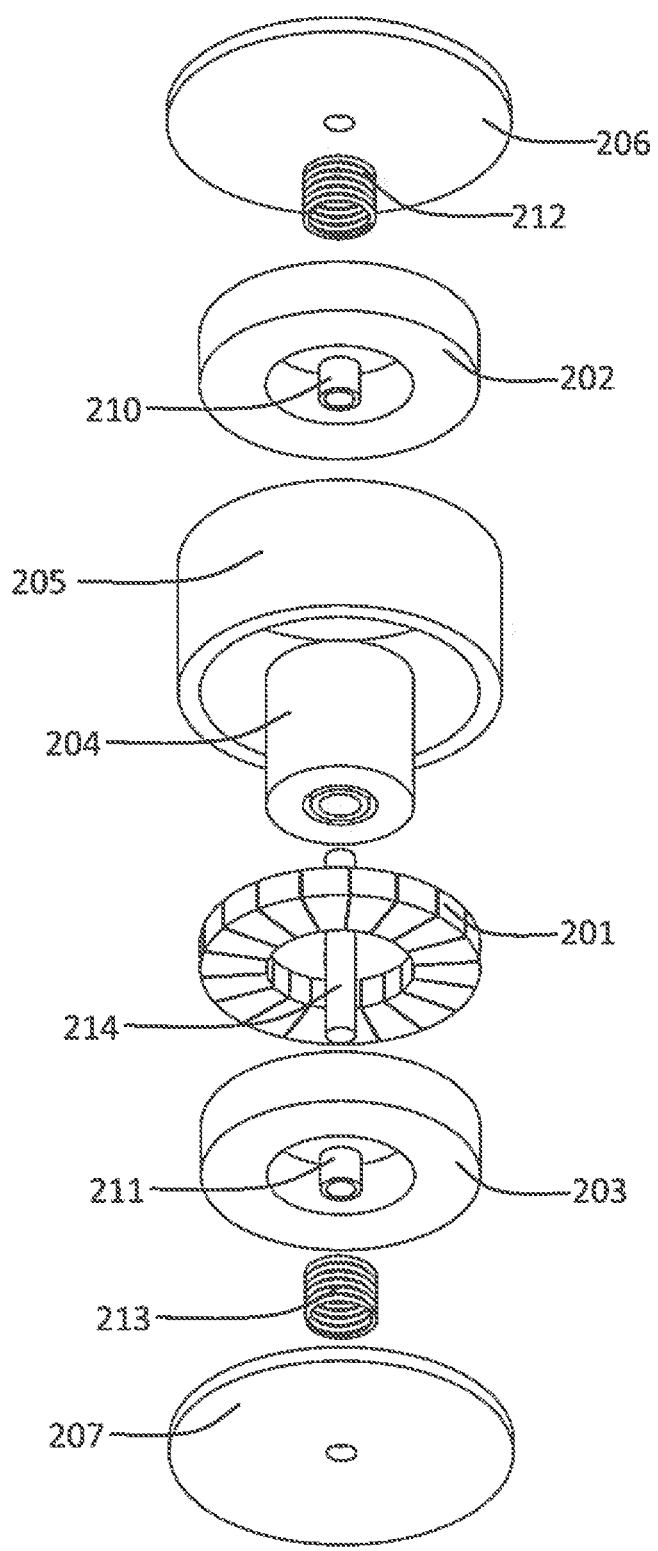
FIG. 7 is an exploded view of the alternate embodiment of the present invention.
Figure 8:
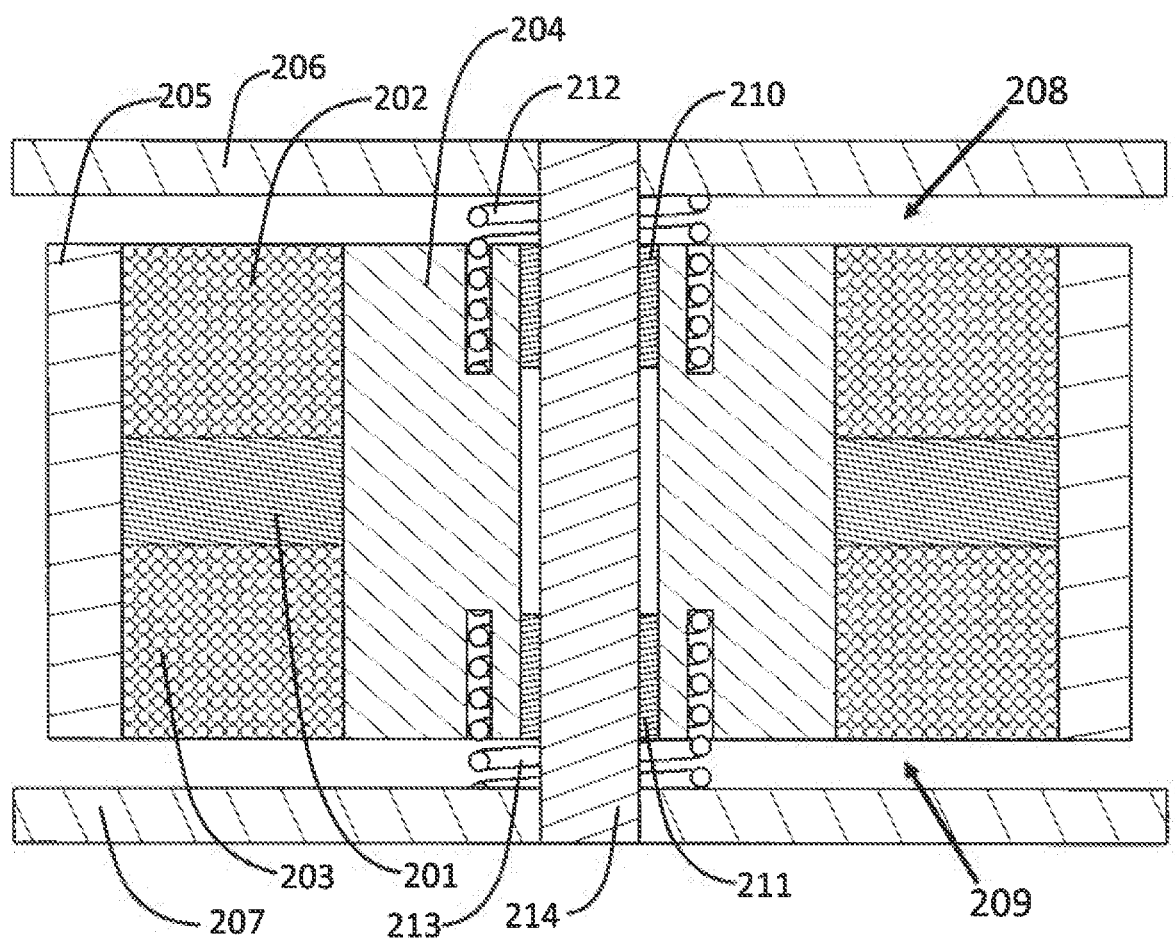
FIG. 8 is a cross sectional view of the alternate embodiment of the present invention.

FIG. 7 and FIG. 8 are two views of the alternate embodiment of the present invention. A radially polarized permanent magnet ring (201) is between and in contact with inner flux cylinder (204) and outer flux cylinder (205). A top drive coil (202) and bottom drive coil (203) are likewise between inner flux cylinder (204) and outer flux cylinder (205) and on each side of radially polarized magnet ring (201). The top drive coil (202) and bottom drive coil (203) are either in series or parallel such that the direction of current flow is the same direction in each coil. Magnet ring (201), inner flux cylinder (204) and outer flux cylinders (205), top drive coil (202), and bottom drive coil (203) are joined and move as a unit forming the moveable inertial mass of the actuator. Top stationary flux return (206) and bottom stationary flux return (207) are separated from the inertial mass by top air gap (208) and bottom air gap (209). The inertial mass is slidably mounted by a top linear bearing (210) and a bottom linear bearing (211) to stationary shaft (214) which connects the top stationary flux return (206) and the bottom stationary flux returns (207). Top spring (212) and bottom spring (213), between top stationary flux return (206) and bottom stationary flux return (207), and the inner flux cylinder (204), provide a restoring force to the inertial mass.

Radially polarized magnet ring (201) is preferably composed of a radial array of high strength magnet segments such as Neodymium Iron Boron (NdFeB) magnets. Inner flux cylinder (204) and outer flux cylinder (205) and top stationary flux return (206) and bottom stationary flux return (207) are preferably made of silicon steel to provide high permeability and low hysteresis. These components may be composed of thin laminations to reduce eddy currents. Spring (212), spring (213), and shaft (214) are preferable made of nonferrous material to prevent a flux path bypassing gap (208) and gap (209). Linear bearing (210) and linear bearing (211) are preferably low friction linear ball bearings to prevent inertial force distortion due to friction. Drive coil (202) and drive coil (203) are preferably wound from insulated copper wire manufactured for coils known as magnet wire.

Figure 9:
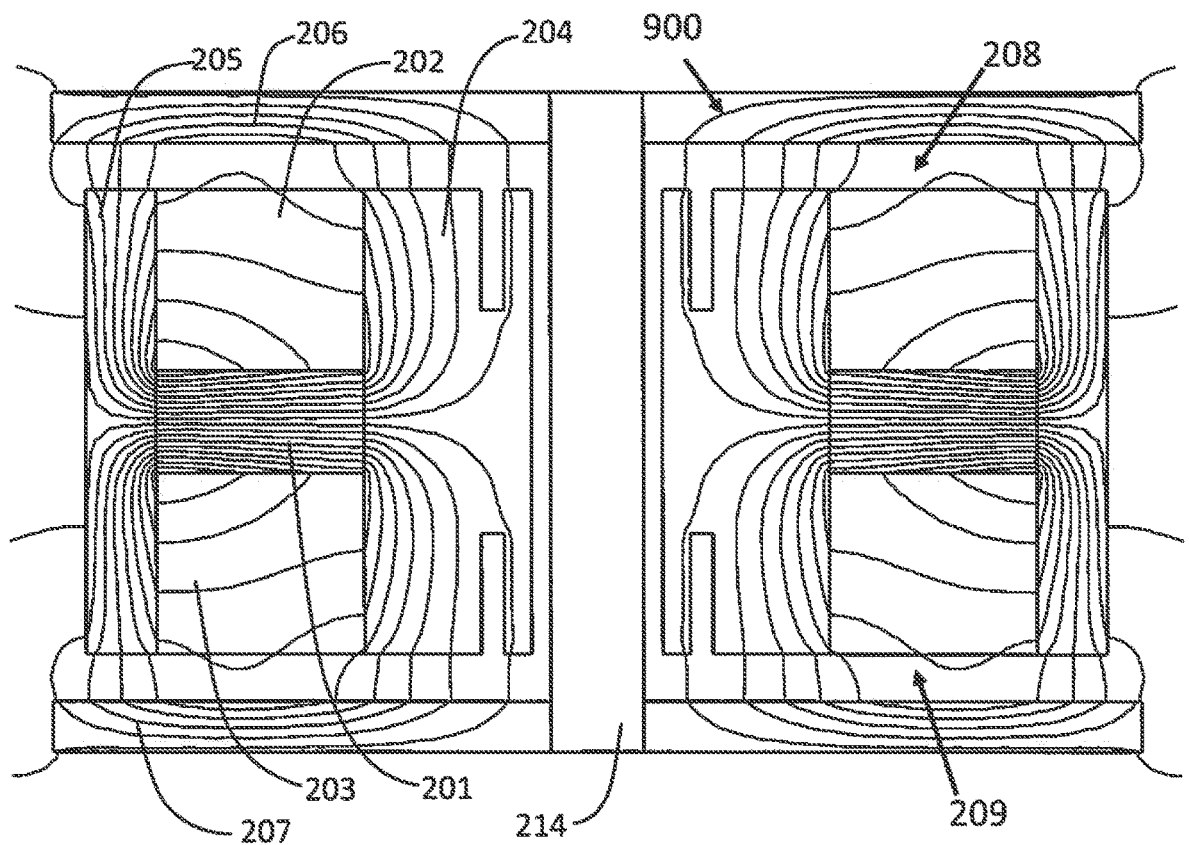
FIG. 9 shows the calculated magnetic flux lines from the permanent magnet ring only for the alternate embodiment of the present invention.

FIG. 9 shows the calculated magnetic flux lines (900) from permanent magnet ring (201) only (no current through drive coil (202) and drive coil (203)) when the inertial mass is in the neutral position. A majority of the magnetic flux lines (900) pass from magnet ring (201) through outer flux cylinder (204), across gap (208) or gap (209), through the top flux return (206) and bottom flux return (207), back across gap (208) or gap (209), and through inner flux cylinder (204) to complete a flux loop back to magnet ring (201).

The magnetic flux passing across gap (208) and gap (209) is called the bias flux. The bias flux is in opposite directions across gap (208) and gap (209). That is, if the bias flux is upward between outer flux cylinder (205) and top stationary flux return (206) then it is downward between outer flux cylinder (205) and bottom stationary flux return (207). For this example, the bias flux is downward between inner flux cylinder (204) and top stationary flux return (206) and upward between inner flux cylinder (204) and bottom flux return (203).

The magnetic flux that does not pass across gap (208) and gap (209) is called magnet leakage flux. Magnet leakage flux lines (900) pass from the permanent magnet ring (201) through outer flux cylinder (205), upper drive coil (202), lower drive coil (203), and inner flux cylinder (204) to complete a flux loop back to magnet ring (201). Minimizing magnet leakage flux reduces the magnetic material required and therefore the cost. Magnet leakage flux is minimized by making the upper drive coil (202) and lower drive coil (203) as thin as practical and the radial extent of the magnet ring (201) as large as practical.

Figure 10:
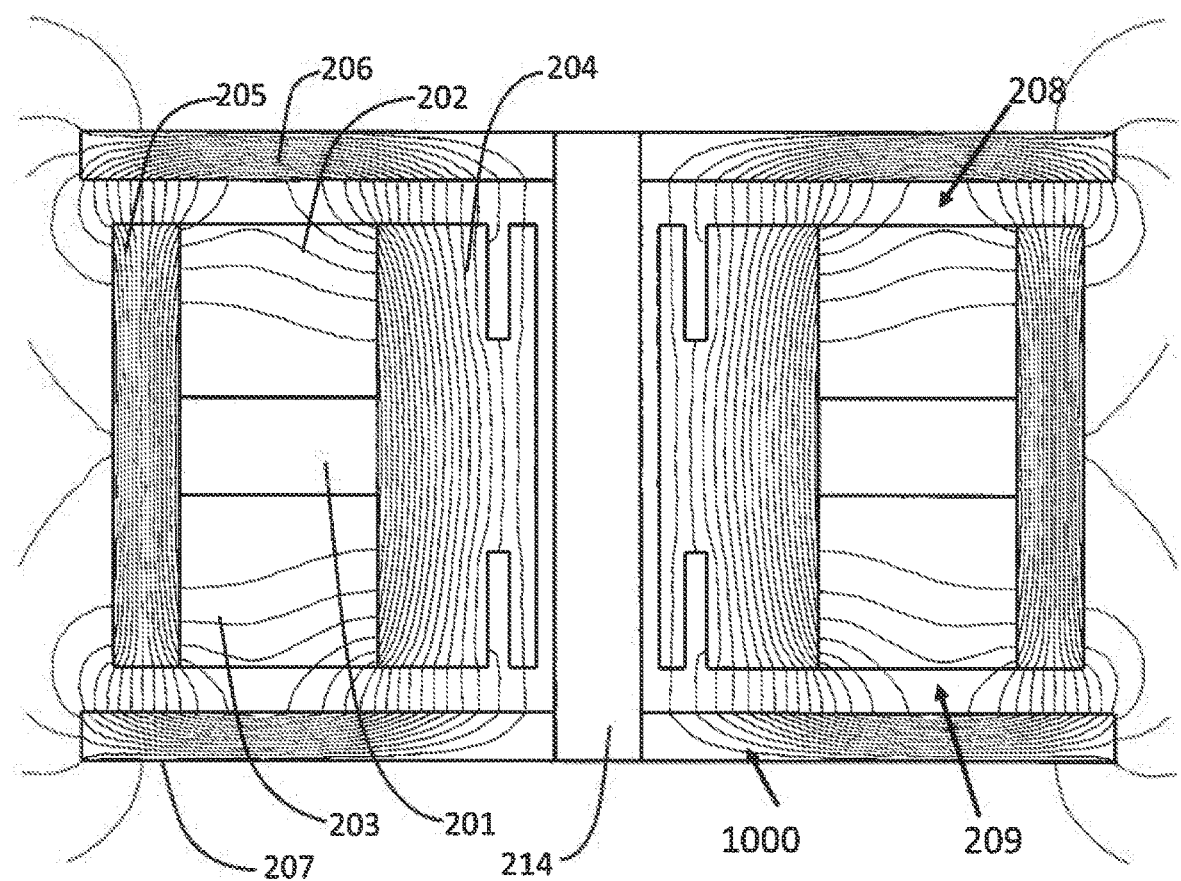
FIG. 10 shows the calculated magnetic flux lines from the drive coils only for the alternate embodiment of the present invention.

FIG. 10 shows the calculated magnetic flux lines (1000) from current through drive coil (202) and drive coil (203) only (no permanent magnet ring) when the inertial mass is in the neutral position. A majority of the magnetic flux lines (1000) pass from inner flux cylinder (204), across gap (208) or gap (209), through stationary flux return (206) and stationary flux return (207), back across gap (208) or gap (209), to outer flux cylinder (204) and back to inner flux cylinder (205) to complete a flux loop. The magnetic flux passing across gaps (208) and (209) is in the same direction. Therefore, if the bias flux is upward between outer flux cylinder (205) and top stationary flux return (206) then it is also upward between outer flux cylinder (205) and bottom station flux return (207). For this example, the bias flux is downward between inner flux cylinder (204) and top flux return (206) and also downward between inner flux cylinder (204) and bottom stationary flux return (207).

Coil flux leakage flux lines (1000) pass from inner flux cylinder (204) to the outer flux cylinder (205) and back to inner flux cylinder (204) to complete a flux loop without crossing gap (208) and gap (209). Minimizing coil leakage flux increases efficiency and reduces inductance. Coil leakage flux is minimized by making drive coils (202) and drive coil (203) as thin as practical and their radial extent as large as practical.

Figure 11:
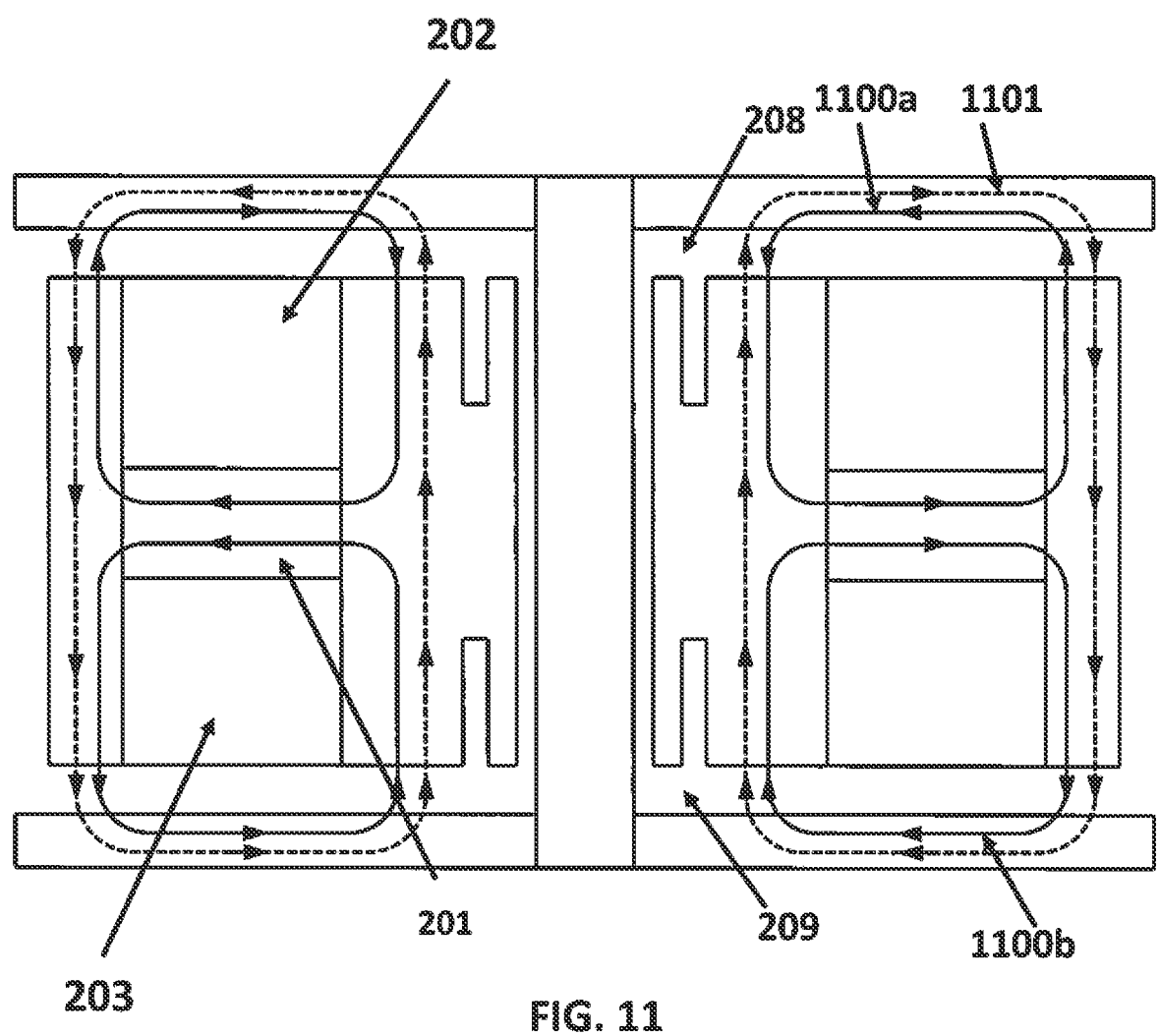
FIG. 11 is a simplified diagram illustrating the primary flux paths for both the permanent magnet ring and the drive coils for the alternate embodiment of the present invention.

FIG. 11 is a simplified diagram illustrating the primary flux paths for both the permanent magnet ring (201), drive coil (202) and drive coil (203) for the alternate embodiment of the present invention. FIG. 11 merely clarifies the flux paths shown in FIG. 9 and FIG. 10. Here, it can clearly seen that the bias flux path (1100*a*) and bias flux path (1100*b*) are in opposite directions across gap (208) and gap (209) while the drive coil flux path (1101) is in the same direction across the gaps.

Figure 12:
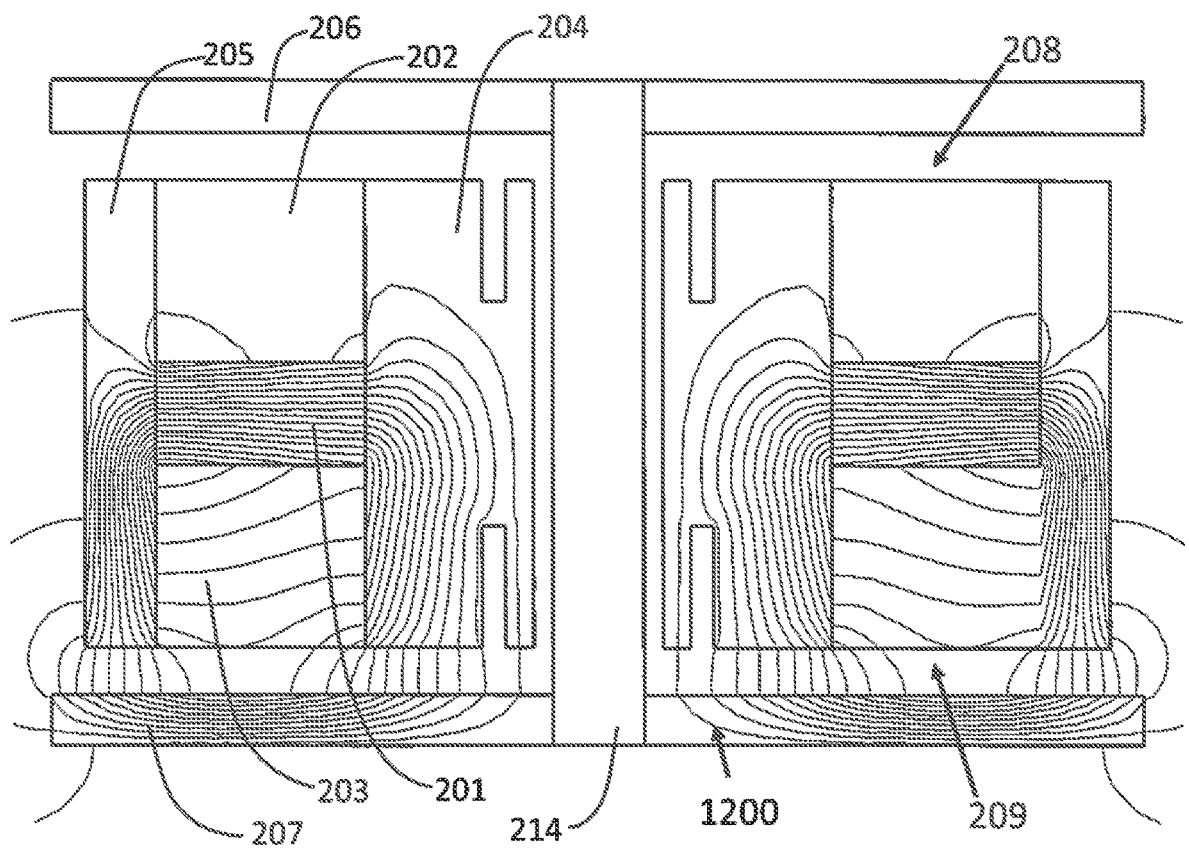
FIG. 12 shows the calculated magnetic flux lines from both the permanent magnet ring and the drive coils for the alternate embodiment of the present invention.

FIG. 12 shows the calculated magnetic flux lines (1200) simultaneously from permanent magnet ring (201) and from current through drive coil (202) and drive coil (203) when the conglomerate inertial mass is in the neutral position. The combination of bias flux and coil flux cancels in top gap (208) and adds in bottom gap (209) because the bias flux is in opposite directions across gap (208) and gap (209) while the coil flux is in the same direction. Thus there is net downward force on the inertial mass and an equal and opposite force upward on top stationary flux return (206) and bottom stationary flux return (207). The resulting force is linear with current through drive coil (202) and drive coil (203). When current through drive coil (202) and drive coil (203) is reversed the combination of bias flux and coil flux cancels in bottom gap (208) and adds in top gap (209) and there is a net upward force on the inertial mass and an equal and opposite force downward on flux returns 105.

Although the invention has been described in detail with particular reference to these preferred embodiments, other embodiments can achieve the same results. Variations and modifications of the present invention will be obvious to those skilled in the art and it is the intent of this application to cover, in the appended claims, all such modification and equivalents. The entire disclosure and all references, applications, patents and publications cited above are hereby incorporated by reference

What is claimed is:

1. A linear electrodynamic actuator comprising:
   a top stationary flux return;
   a bottom stationary flux return;
   a stationary shaft, with a top side and a bottom side, that connects the top stationary flux return to the bottom stationary flux return;
   a first linear bearing connected to the top side of the stationary shaft;
   a second linear bearing connected to the bottom side of the stationary shaft; and
   a movable inertial mass slidably mounted by the first linear bearing and the second linear bearing to the stationary shaft, between the top stationary flux return and the bottom stationary flux return, wherein
   a first air gap separates the top stationary flux return the movable inertial mass, and wherein
   a second air gap separates the bottom station flux return from the movable inertial mass, and wherein
   the movable inertial mass comprises:
   an inner flux cylinder;
   an outer flux cylinder;
   a top radially polarized permanent magnet ring between and in contact with the inner flux cylinder and the outer flux cylinder;
   a bottom radially polarized permanent magnet ring, below the top polarized permanent magnet ring, between and in contact with the inner flux cylinder and the outer flux cylinder;
   a drive coil between the inner and outer flux cylinder and between the top polarized permanent magnet ring and bottom polarized permanent magnet ring;
   a first spring between the top flux return and the inner flux cylinder; and
   a second spring between the bottom flux return and the inner flux cylinder.

2. The linear electrodynamic actuator of claim 1, wherein the top radially polarized permanent magnet ring and bottom radially polarized permanent magnet ring are composed of a circumferential array of magnet segments.

3. The linear electrodynamic actuator of claim 1, wherein the inner flux cylinder and the outer flux cylinder are made of silicon steel.

4. The linear electrodynamic actuator of claim 1, wherein the top flux return and bottom flux return are composed of silicon steel.

5. The linear electrodynamic actuator of claim 1, wherein the first spring between the top flux return and the inner flux cylinder and the second spring between the bottom flux return and the inner flux cylinder are composed of a non-ferrous material.

6. The linear electrodynamic actuator of claim 1, wherein the first linear bearing and the second linear bearing are ball bearings.

7. The linear electrodynamic actuator of claim 1, wherein the drive coil is wound from insulated copper wire.

8. The linear electrodynamic actuator of claim 1, wherein the first air gap and the second air gap accommodate axial motion of the inertial mass.

9. The linear electrodynamic actuator of claim 1, wherein magnetic flux, extending from the top and bottom magnetic rings, creates bias flux loops through the outer flux cylinder, across the first and second air gaps, through the top and bottom stationary flux returns, back across the first and second air gaps, through the inner flux cylinder, back to the top and bottom permanent magnet rings.

10. The linear electrodynamic actuator of claim 9, wherein the magnetic flux across the first and second air gaps provides a bias flux for operating the actuator.

11. The linear electrodynamic actuator of claim 9, wherein the bias flux is in opposite directions across the first and second air gaps.

12. The linear electrodynamic actuator of claim 1 wherein a magnetic flux, extending from the drive coil, creates a coil flux loop through the outer flux cylinder across the first air gap, through the top stationary flux return, back across the first air gap, through the inner flux cylinder, across the second air gap, through the top stationary flux return, back across the first gap, and through the outer flux cylinder.

13. The linear electrodynamic actuator of claim 12, wherein the coil flux is in the same direction across the first and second air gaps.

14. The linear electrodynamic actuator of claim 12, wherein a combination of bias flux and coil flux cancels in the first air gap and adds in the second air gap, creating a net force on the inertial mass and an equal and opposite force on the top and bottom stationary flux returns, which creates a resulting linear force with current through the drive coil in the opposite direction when the current through the drive coil is reversed.

* * * * *